A. WARTH.
Guide for Sewing Machines.
No. 51,247.  Patented Nov. 28, 1865.
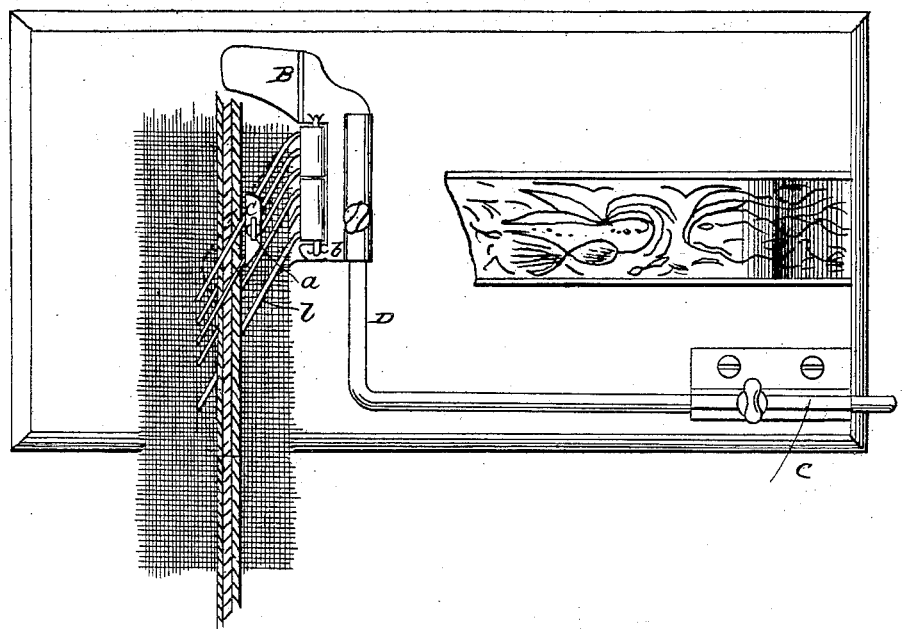
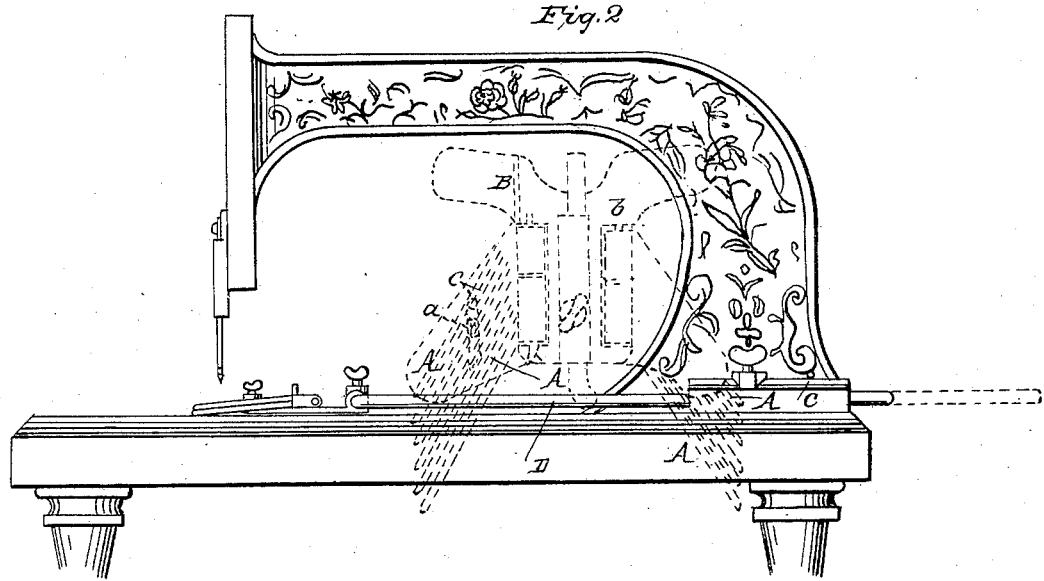

UNITED STATES PATENT OFFICE.

ALBIN WARTH, OF STAPLETON, NEW YORK.

IMPROVEMENT IN GUIDES FOR SEWING-MACHINES.

Specification forming part of Letters Patent No. 51,247, dated November 28, 1865.

*To all whom it may concern:*

Be it known that I, ALBIN WARTH, of Stapleton, in the county of Richmond and State of New York, have invented a new and useful Improvement in Sewing-Machines; and I do hereby declare that the following is a full, clear, and exact description thereof, which will enable others skilled in the art to make and use the same, reference being had to the accompanying drawings, forming part of this specification, in which—

Figure 1 represents a plan or top view of this invention. Fig. 2 is a side elevation of the same.

Similar letters of reference indicate like parts.

This invention relates to a cloth-guide for a sewing-machine, which is composed of a fork with three or more prongs, so that the strain on the material to be sewed as the same is drawn through the guide produces the requisite friction, and no basting is required. By giving to the prongs of the forked guide an oblique position the material to be sewed is carried up against the gage, and by using two or more guides placed side by side, or one above the other, two or more pieces of material can be sewed together, and a straight seam can be produced without basting. An adjustable gage fastened to the prongs of the guides serves to regulate the position of the different pieces of material in relation to each other. The guide or guides are used in combination with the ordinary gage, which is adjustable on an angular guide-bar in such a manner that when the guides and gages are not needed they can be pushed back and turned up on the side of the standard supporting the needle-slide and mechanism for operating the same, and when said guides and gages are required they can be readily adjusted in the desired position.

A represents a guide composed of a fork with three or more prongs. These prongs are placed in an oblique position, and on drawing the material to be sewed through between them the strain of the material on the fork itself produces the requisite friction and holds the seam in the proper position without basting.

By the oblique position of the prongs the edge of the material to be sewed is carried up against the shoulder B, which forms the gage, and a straight and even seam is produced without requiring much attention from the operator.

In order to be able to sew two or more pieces of material together, I place two or more of my guides side by side, or one above the other, and each piece of material is drawn through the prongs of its guide and carried along in the proper direction without basting.

By applying an adjustable gage, C, to the additional guide A', I am enabled to regulate the position of the different materials in relation to each other, and to sew a tape on a piece of cloth at any desired distance from the edge of the latter, in a straight line, without basting.

The gage C is adjustable by a set-screw, $a$, or any other suitable means.

The guide or guides A A' are hinged to the main gage B by means of a pivot, $b$, and said main gage is adjustable on an angular guide-bar, D, which slides back and forth in a tubular bracket, $c$, that is firmly secured to the table or cloth-plate of the machine. When the gage and the guides are not needed the angular guide-bar is made to slide back toward the standard E, which rises from the table, and by turning the same from the position shown in red outlines in Fig. 2 to that shown in blue outlines the entire device is out of the way, and the table of the sewing-machine is free for any desired operation, and if the gage and guides are needed they can be readily adjusted in position. If the gage alone is required, the guides can be turned back out of the way.

By this arrangement an attachment to a sewing-machine is obtained which saves much time generally spent in basting, and, furthermore, the gage and guides, being always on hand, are readily adjusted, and the operation of sewing can be effected with more accuracy than with the ordinary gage, which is entirely detached from the machine, and many times not applied because it is too much trouble to look the same up and adjust it in position.

What I claim as new, and desire to secure by Letters Patent, is—

1. A cloth-guide for a sewing-machine, composed of a fork with three or more prongs disconnected at their outer ends, substantially as and for the purposes set forth.

2. Giving to the prongs of the forked guide an oblique position, substantially as and for the purposes described.

3. The adjustable gage C, applied to the forked guide A', substantially as and for the purposes set forth.

4. The angular guide-bar D, in combination with the forked guide or guides and with the main gage B, constructed and operating substantially as and for the purposes described.

ALBIN WARTH.

Witnesses:
M. M. LIVINGSTON,
C. L. TOPLIFF.